Apr. 24, 1923.

H. B. CHASE, JR

FLY FOR FLY FISHING AND SIMILAR USES

Filed Aug. 4, 1922

1,452,593

Inventor,
Horace B Chase Jr.
By Phillips Abbott
Attorney.

Patented Apr. 24, 1923.

1,452,593

UNITED STATES PATENT OFFICE.

HORACE B. CHASE, JR., OF PARIS, FRANCE.

FLY FOR FLY FISHING AND SIMILAR USES.

Application filed August 4, 1922. Serial No. 579,946.

*To all whom it may concern:*

Be it known that I, HORACE B. CHASE, Jr., a citizen of the United States, and a resident of the city of Paris, France, have invented a new and useful Improvement in Flies for Fly Fishing and Similar Uses, of which the following is a specification, reference being had to the accompanying drawings.

It is the purpose of this invention to provide the fly with certain vibrating or tremulous elements, which shall simulate the wings of an insect, so arranged and combined with the other parts as that when in use they shall vibrate, tremble or flutter, thus simulating the wing action of a live insect, and materially increasing the deceptive effect of the device.

Figure 1:
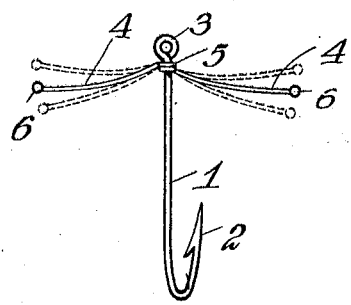
Figure 2:
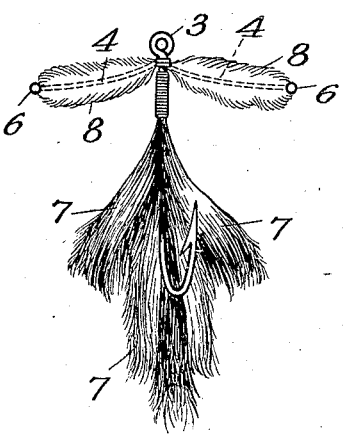
Figure 3:
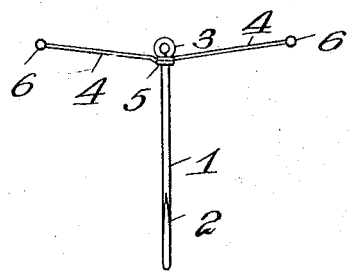

The figures of the drawing hereof are considerably enlarged as compared with the size of an ordinary fly, so that the construction may be better understood. Figure 1 is an elevation of the skeleton of my improved fly, the vibrating or tremulous action of the wing elements being indicated in dotted lines and no hackle or dressing being shown; Figure 2 is an elevation of one form of the completed fly; Figure 3 is an elevation similar to Fig. 1 of a modified construction.

In the drawings 1 represents the shank of the hook; 2 the point thereof, 3 the eye, or equivalent terminal, to which the line is fastened. 4, 4, are delicate and highly resilient wing members, preferably but not necessarily made of non-rusting metal. They are rigidly fastened at their inner end, as at 5, to the shank of the hook, and are preferably provided on their outer ends with slight enlargements or weights, 6, 6, as, for example, a globule of solder, so as to increase the vibratory, fluttering or tremulous action of these members.

In Fig. 2 the hackle or other dressing is shown applied to the body of the hook as at 7, and 8 represents dressing, made to simulate the wings of an insect, which is suitably fastened to the members 4.

The operation is as follows: As is well known in fly fishing, the cast is supposed to drop the fly upon the surface of the water and the fly is thereafter made to skip along that surface after the manner of an insect to attract the attention of the fish. The violent movement given to the fly by the cast and the impact with the water and the subsequent skipping movement over the surface of the water cause the highly resilient wing members 4 to vibrate rapidly, thus producing a striking resemblance to an insect struggling to rise from the water, and this simulation is so perfect as to materially enhance the deceptive quality of the device.

In Fig. 3 I show a construction in which the wing members 4, 4, are each arranged at an angle relative to the plane of the hook, this construction being desirable in many instances, since it tends to keep the wing members somewhat above the surface of the water, thus contributing to their rapid vibration.

Sometimes I do not employ any hackle or dressing on the vibratory wing members 4, 4, on the contrary, leave them naked. This has the effect of increasing their vibratory action and if the material and colorings of these members be such as to simulate the wings of the desired insect, the result in some cases is better than if dressing be employed on them. Moreover, by the term "dressing," as applied to the wing members, I include any added webbing, film, or equivalent material suitable for the purpose.

It will be obvious to those who are familiar with such matters that the form of the invention herein shown and described are two only of many in which it may be embodied, and that various departures may be made from the details shown and described without departing from the essentials of the invention. I therefore do not limit myself to such details.

I claim:

A fly comprising a hook and resilient wing members made to simulate the wings of an insect attached to the hook at their inner ends only and weighted at their outer ends.

In testimony whereof I have signed my name to this specification.

HORACE B. CHASE, JR.